Figure 1:
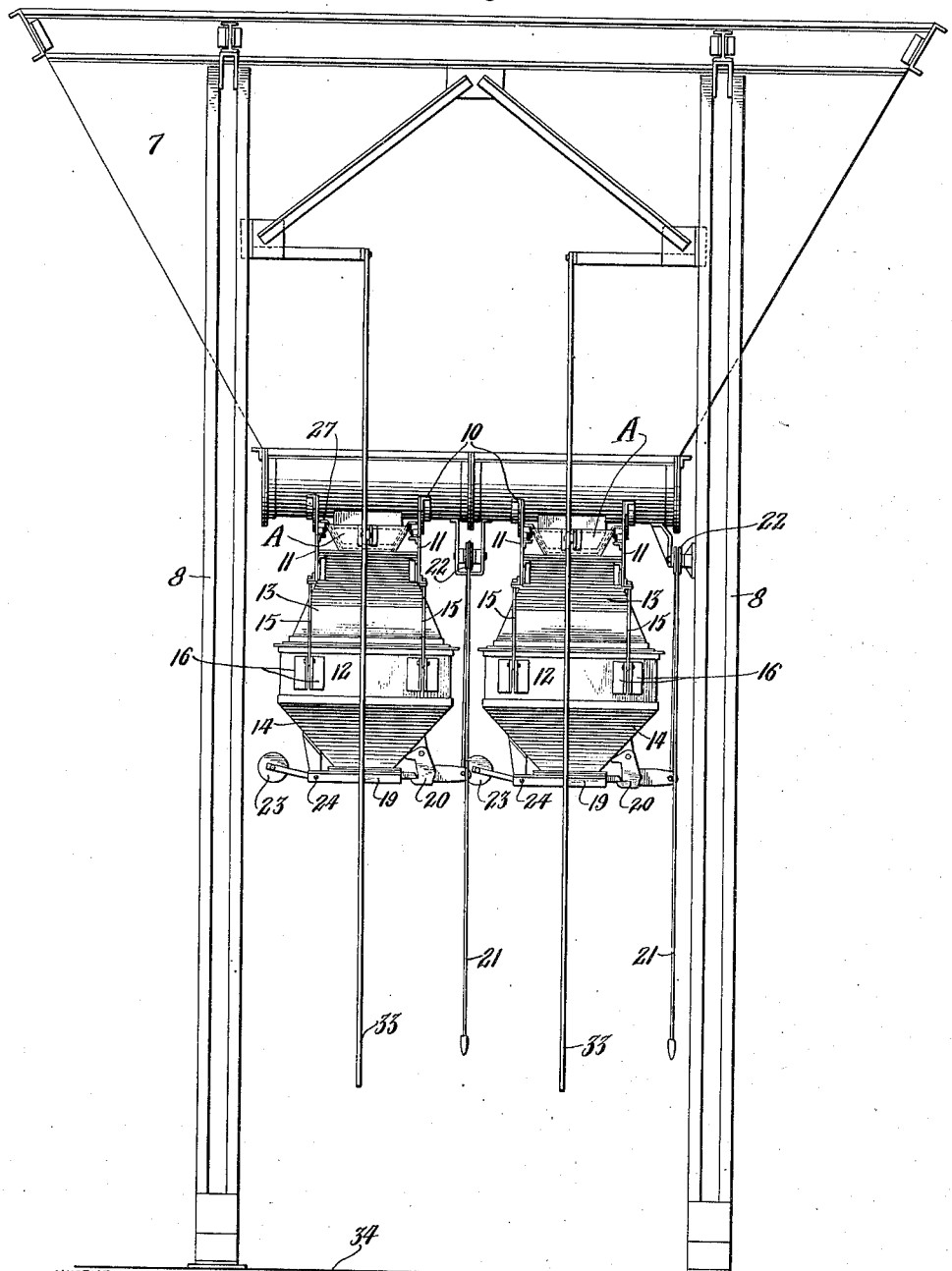

Feb. 2, 1926. 1,571,544
A. F. GARLINGHOUSE ET AL
MEASURING DEVICE FOR BULK MATERIALS
Filed Feb. 27, 1922 5 Sheets-Sheet 1

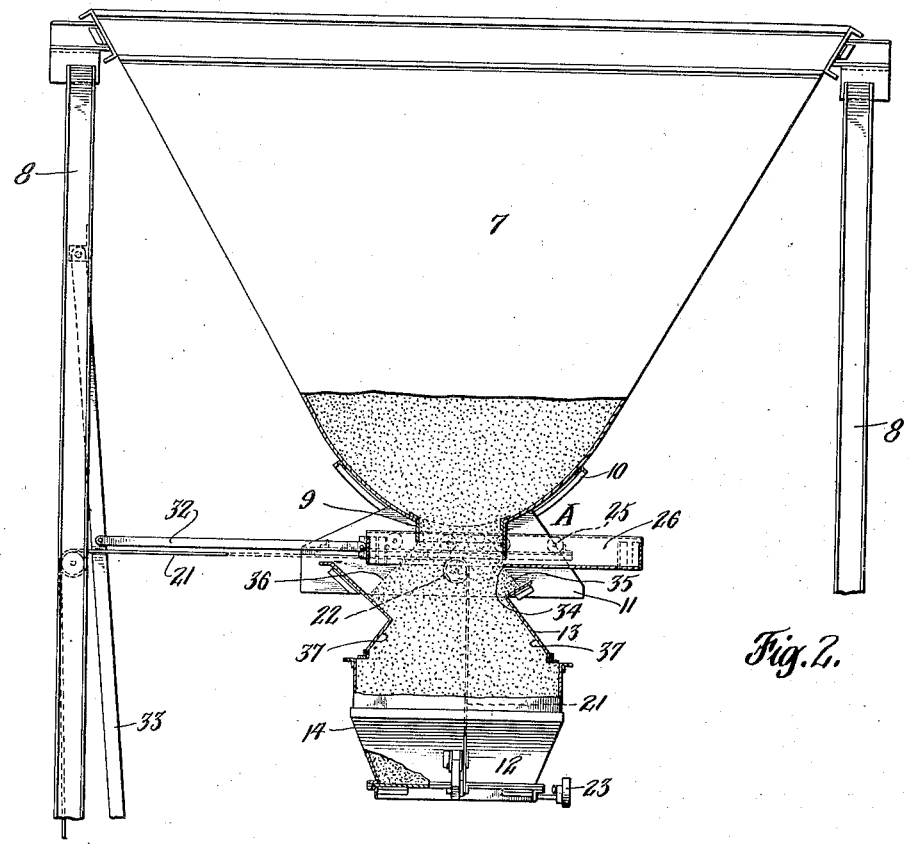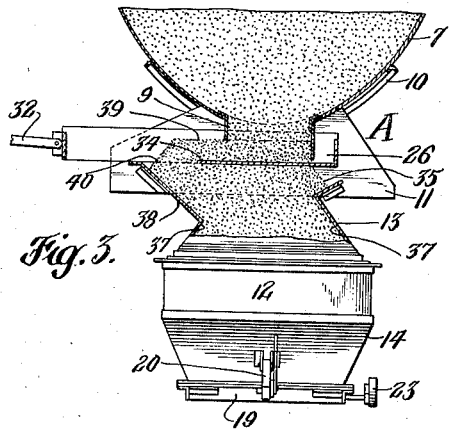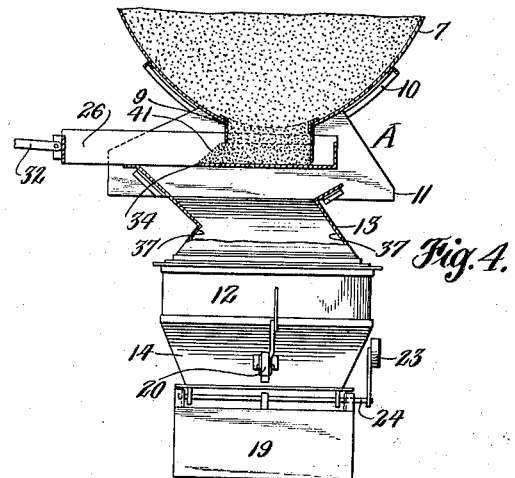

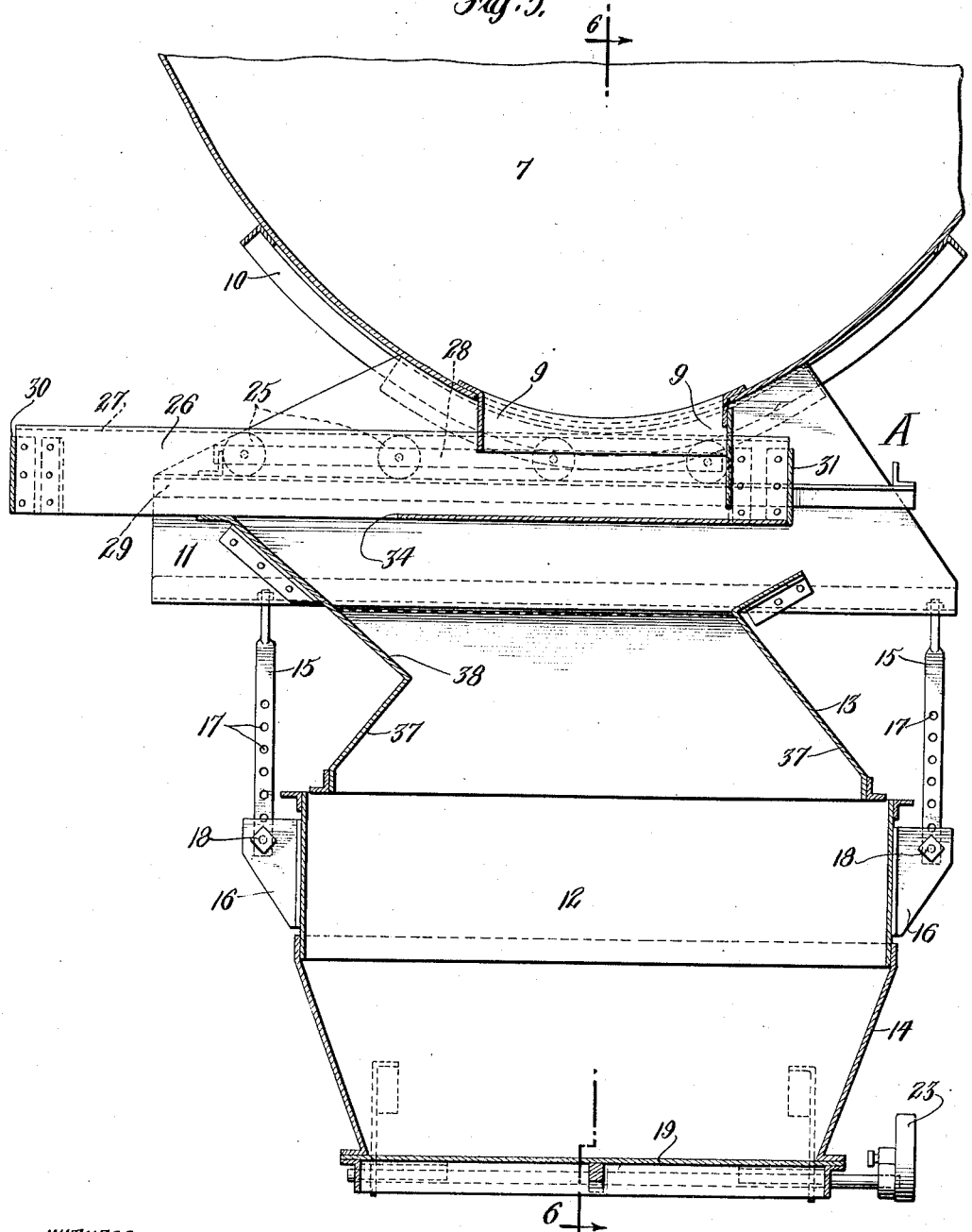

Feb. 2, 1926.
A. F. GARLINGHOUSE ET AL
1,571,544
MEASURING DEVICE FOR BULK MATERIALS
Filed Feb. 27, 1922     5 Sheets-Sheet 4
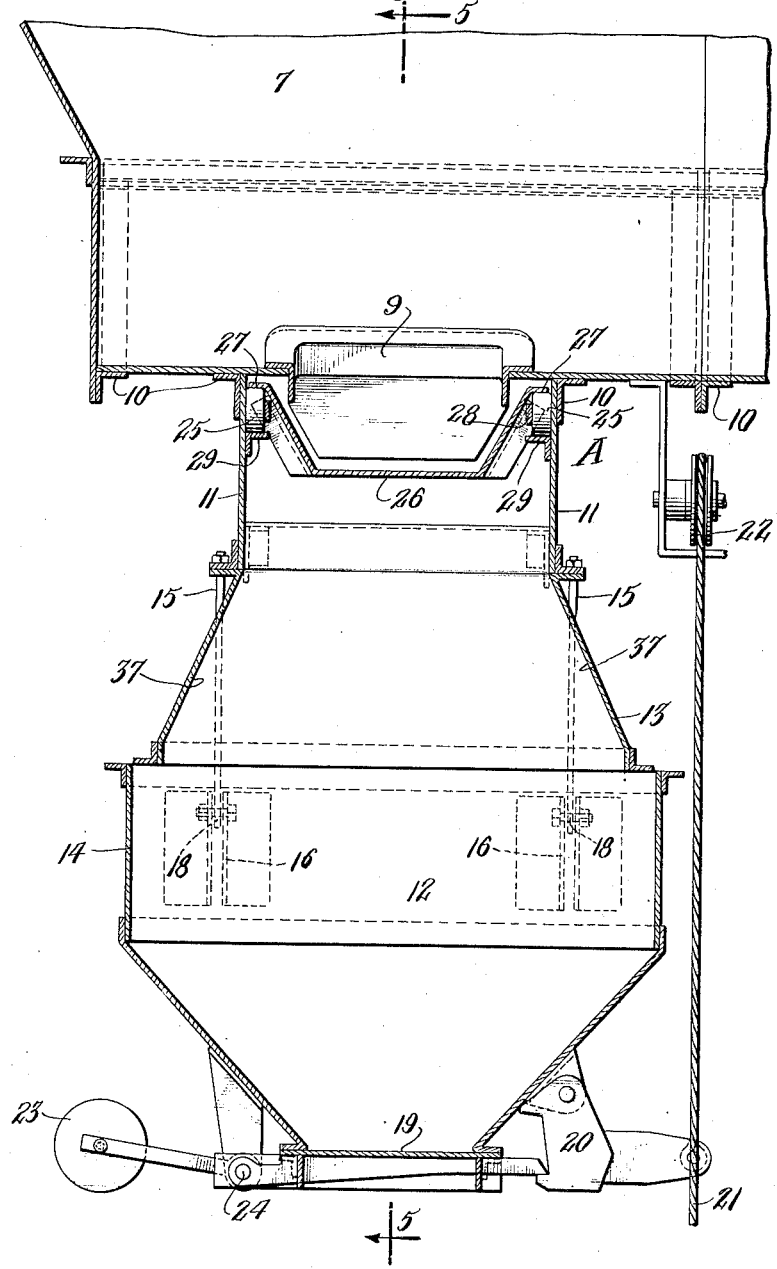

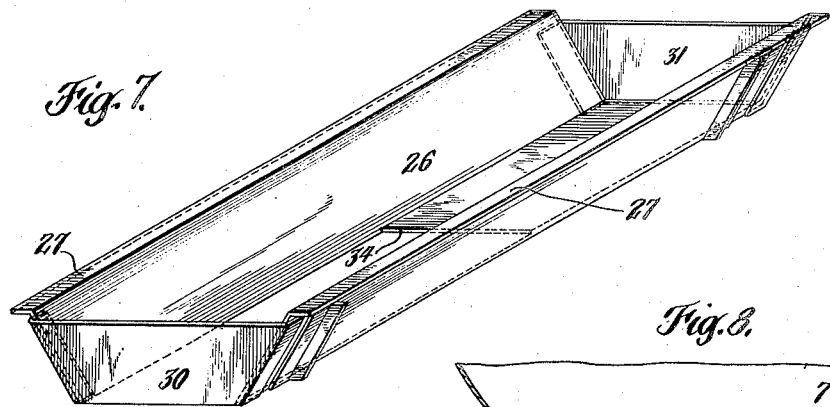
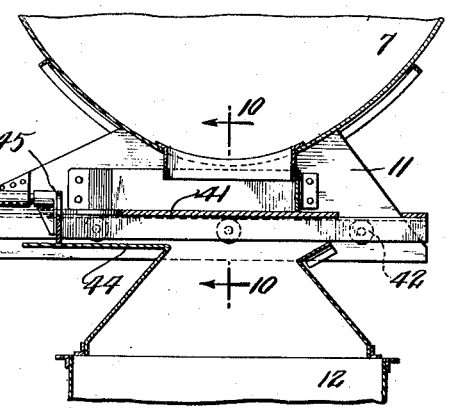
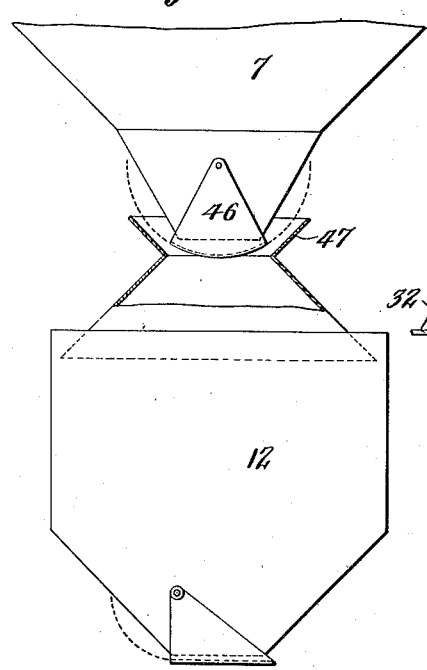
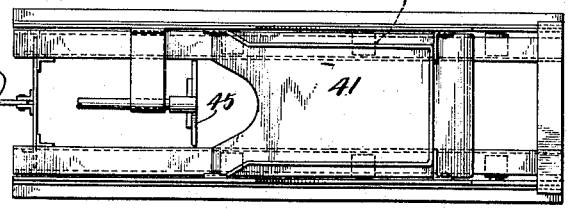
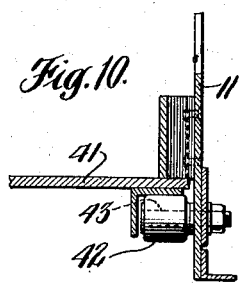

Patented Feb. 2, 1926.

1,571,544

UNITED STATES PATENT OFFICE.

ALBERT F. GARLINGHOUSE, OF ASPINWALL BOROUGH, AND WILLIAM M. VENABLE, OF PITTSBURGH, PENNSYLVANIA, ASSIGNORS TO BLAW-KNOX COMPANY, A CORPORATION OF NEW JERSEY.

MEASURING DEVICE FOR BULK MATERIALS.

Application filed February 27, 1922. Serial No. 539,391.

*To all whom it may concern:*

Be it known that we, ALBERT F. GARLINGHOUSE and WILLIAM M. VENABLE, both citizens of the United States, respectively residing at Aspinwall Borough, in the county of Allegheny and State of Pennsylvania, and at Pittsburgh, in the county of Allegheny and State of Pennsylvania, have invented certain new and useful Improvements in Measuring Devices for Bulk Materials, of which the following is a specification.

Our invention relates to the handling of bulk materials, such, for example, as sand, gravel, and broken stone used in concrete construction, and is especially concerned with a novel gate, for controlling the outflow of the material, that is particularly useful in connection with measuring devices of the type most convenient for such materials. This type of measuring device or "batcher," as we term it, generally comprises a supply or storage bin for the bulk material, with a discharge outlet at its bottom; a measuring hopper or receptacle receiving the material from such outlet, and provided with a discharge door of its own at its bottom; and our novel gate for controlling the flow from the bin to the measuring hopper. In this relation, our type of gate presents the advantage that it permits of liberal clearances above and below the moving gate proper, between gate and discharge outlet above, and between gate and measuring hopper below; that it can be operated with remarkable ease of movement,—even in closing (as it must) through a mass or column of material extending unbroken from the measuring hopper up into the bin,—and hence very rapidly; that it allows the natural slope of the material discharged from the outlet to determine the upper limit of the batch, and admits of great accuracy of measurement without necessity for a "strike off" to determine this limit.

Our invention also presents various other novel features that are advantageous in apparatus of this character, even aside from our type of gate.

The general objects of the invention are involved in the provision of a device of this character which can handle the materials with great rapidity, accuracy in the quantity measured and efficiency. Briefly described our improved batcher, as we have termed it, comprises a measuring hopper or receptacle adjustable as to cubical contents having a door at the bottom through which it can be emptied, a supply bin or receptacle above this hopper in which the material to be measured is stored and a gate between these two receptacles for controlling the flow from the supply bin into the measuring hopper. With this in mind the objects of our invention may be more particularly stated as residing in first, the provision of a gate which acts as a combined closure member and strike off for the top of the batch; second, the provision of liberal clearances above the gate between it and the supply bin and also below the gate between it and the measuring hopper; third, the provision of an adjustable measuring hopper; fourth, the provision of a construction in which the natural slope of the material as fed from the bin is utilized to fix the upper limit of the batch; fifth, the provision of a measuring hopper in which the sides of the upper portion slope toward the gate opening so that the hopper is entirely filled when the gate is opened; and sixth, the provision of a device of this character in which the gate always displaces a uniform amount of the material which can afterwards be introduced into the batch without introducing an unreliable or variable element therein.

The foregoing together with such other objects and advantages as may appear hereinafter or are incident to our invention, we obtain by means of a construction which is illustrated in preferred form in the accompanying drawings, wherein:

Fig. 1 is a front elevation of our improved batcher showing the general arrangement of the parts; Fig. 2 is a partial side elevation and section illustrating our improvements and showing the gate in open position with the measuring hopper filled from the supply bin; Fig. 3 is a view similar to that of Fig. 2 but omitting unnecessary parts which illustrate the device and the condition of the material after the gate has been closed; Fig. 4 is a view similar to that of Fig. 3 with the gate still in closed position but just after the doors at the bottom of the measuring hopper have been opened to discharge the batch; Fig. 5 is a vertical longitudinal section through the measuring hopper the gate and the lower end of the supply bin on a scale which is greatly enlarged from that of the previous figures and showing the gate in closed position (the view being taken on the line 5—5 of Fig. 6); Fig. 6 is a vertical transverse section taken on the line 6—6 of Fig. 5; Fig. 7 is an isometric projection of the gate member proper illustrated in the foregoing figures; Fig. 8 is a section taken similarly to that of Fig. 5 but illustrating a modification; Fig. 9 is a plan section of the device of Fig. 8; Fig. 10 is a section taken on the line 10—10 of Fig. 8; and Fig. 11 is a side elevation and partial section illustrating particularly another modification having specific reference to the gate.

Referring to the drawings and, in the first place, particularly to Figs. 1 to 7 inclusive, it will be noted that our storage bin or receptacle 7 is supported in an elevated position upon any suitable structural work including posts 8. The bottom of the bin is provided with a discharge opening to which is fitted a downwardly extending rim or collar 9. The bottom of the bin is stiffened by means of projecting angle irons 10 to certain of which are suitably attached the gate structure indicated as a whole by the reference letter A. The gate structure includes a pair of vertically disposed plates 11 which extend in a direction longitudinally of the gate and secured to a pair of oppositely disposed angle irons 10.

The measuring hopper or receptacle 12 is secured to the lower edges of the plates 11. In Fig. 1 the bin 7 is shown as equipped with two measuring hoppers but it will be understood that one, two or any desired number can be employed. By using a plurality of them they can be filled from the same bin and dumped at practically the same time into wagons, boxes or other receptacles placed beneath them and in this way a number of batches may be deposited without delay and practically at the same time.

The hopper is made in two sections, an upper section 13 which is fixed in position with respect to the gate and a lower section 14 which is made adjustable with respect to the upper section by means of the hanger bolts 15. The lower ends of the bolts 15 extend between lugs 16 projecting from the sides of the lower section 14 and by virtue of a series of holes 17 in the bolts 15 the lower section can be raised or lowered to vary the cubical contents of the measuring hopper. Adjustment is made simply by removing the bolts 18 which extend through the lugs and the hanger bolts 15 and then in replacing them in whatever hole 17 may be desired. The upper section 13 telescopes within the lower section 14. The bottom of the measuring hopper is provided with a pivoted dumping door 19 which is held closed when the hopper is full by means of the latch 20. When it is desired to empty the hopper the latch 20 is released by pulling upon the rope 21 reaved over the pulley 22. The weight of the contents then forces the door open after which it is returned to its closed position by means of the weights 23 hung to the left of the pivot point 24.

Between the vertical plates 11 we mount upon a series of rollers 25 a trough-shaped gate 26 which is provided with horizontally extending flanges 27 adapted to rest upon the top of the rollers. The rollers are spaced the proper distance apart by means of a guide strip 28 and the rollers are free to travel back and forth along the tracks or angles 29. The forward end of the gate is provided with a transverse plate 30 and the rear end with another transverse plate 31. The gate is retracted or advanced by means of the tie rod 32 and the long lever 33 extending to a point within reach of the operator standing upon the ground 34. (See Fig. 1). The gate is shown in its advanced or closed position in Figs. 3, 4, 5 and 6 and in its open position in Fig. 2.

We wish to state that although we have illustrated a trough-shaped gate and prefer such, it is not an essential to the invention and a perfectly flat gate or gates of other configuration might be used as will further appear in connection with Figs. 8 to 11 inclusive.

As seen probably most clearly in Fig. 7, the bottom portion of the trough-shaped gate is cut back for a certain distance from the transverse plate 30 in order to present an edge 34 to the material through which it is to be pushed.

The distance or interval between the bottom of the gate and the bottom edge of the ring or collar 9 should be ample to permit free movement without any tendency to clogging or binding. For broken stone used in concrete construction the distance should be approximately 5 or 6 inches but for sand it may be as little as 1 or 2 inches. We find in practice, however, that it is best to make this distance suitable for the coarsest material to be handled for we have found by experience that it is not necessary to lessen it for other materials. By introducing such figures we do not wish to limit ourselves to any particular distance as the proper distance for any particular material must be determined by experiment if it does not come within the limits mentioned. The operation of our improved apparatus will be most clearly understood by reference to Figs. 2, 3 and 4. In Fig. 2 the gate is shown in its open position so that the material in the supply receptacle or bin 7 is free to fall down into the measuring hopper 12 and in this figure the material has been illustrated as having filled the measuring hopper. As the material runs from the bin into the hopper it takes a certain slope at the right hand side marked by the reference character 35 and a similar slope at the left hand side marked by the reference character 36, this slope being in all cases the natural slope which the material will take when freely piled. In the case of sand or broken stone it is approximately at an inclination of 45° to the horizontal but different materials will take different slopes. The movement of the horizontal gate 26, it will be observed, is in a direction whose angle with the slope 36 is less than a right angle.

At this point we wish to point out that the upper portion of the measuring hopper has sides which slope toward the gate and referred to by the character 37 and it is important that the slope of these sides shall not be less than the natural slope of the material as otherwise the material will not fill out against the walls.

In Fig. 3 is illustrated the position of the material after the gate has been closed and may be said to illustrate one of the most important achievements of this invention. It will be observed that there is a surplus of material pushed to the left and resting upon the upper portion of the outward lateral apron extension 38 of the open-topped hopper 12, which extends well beyond the corresponding edge of the discharge outlet 9. This results from the fact that as the gate is moved all the material resting upon it is moved with it and is pushed to the left with the front edge of the projecting collar 9 acting as a limit to the point where the material can flow from the upper bin. In other words, the gate 26 in closing not only pushes ahead the material in front of it, but also displaces material from the outlet 9 laterally and downward, past the edge of the latter and its own front edge, thus causing a lateral feeding or discharge of an amount additional to what ran out while the gate was open. The surface 39 of this surplus material is substantially horizontal and the outer edge or surface of this material 40 assumes the natural slop line of the material. The surplus material is substantially that portion of the material in Fig. 3 which lies to the left of the line 36 in Fig. 2 and we have found by experience that the material so displaced by moving the gate to its closed position is always uniform in amount and that by making allowance for this displaced material in computing the size of the batch no unreliable or variable element is introduced. There is, therefore, no practical objection whatever to considering the displaced material a part of the measured batch. The slope of the apron 38 is such that it will readily fall into the hopper proper and be discharged at the time the hopper is emptied as illustrated in Fig. 4. In Fig. 4 the slope 41 is the natural slope of the material left by the running off of the displaced surplus around the front edge of the gate 26; hence it will be seen that when closed the gate extends beyond the natural slope of material from the edge of the outlet 9 and intercepts and prevents further outflow from the latter. It will also be clear that we utilize the natural slope line 41 of the material in separating the batch from the supply in the bin. The natural slope line of the material is also termed the angle of repose.

An inspection of Fig. 3 will show that there is no possibility of the cutting edge of the gate binding on account of the clogging of material between it and the collar 9 or the apron 38. Liberal clearance intervals are provided at both of these points and because of this the gate goes through the material with great ease. Moreover, the movement of the gate is additionally and very greatly eased by its lateral displacement of material resting on it; for the gate does not have to slide against this material, or even to do the whole work of carrying it along under the pressure from above, but merely imparts to this material a lateral impulse sufficient to overcome the "angle of repose effect," and thus enables the pressure from above to force the material laterally with the gate. Owing to this action, indeed, the gate shown in Figs. 1 to 6 closes even more easily than it opens.

From the foregoing it will be seen that the gate acts not only as a closure member but also as a "strike off" as it is termed. In all prior constructions with which we are familiar there has been a separate strike off necessary in addition to the closure gate which generally comprised some sort of a straight edge which is passed across the upper edges of the measuring hopper in order to level it off and thereby ensure an accurate measurement in the batch.

This brings us to another important feature of the invention, namely, the adjustability of the hopper. It will be noted that our improved measuring hopper is fixed at its upper part with reference to the supply bin. This makes it possible to use the same combined gate and strike off no matter what the size of the batch being measured in the hopper. It has been proposed to use movable hoppers but by our improvement this is unnecessary.

The trough-shaped gate illustrated in Figs. 1 to 7 inclusive is the one which we prefer to use because its sides can be made practically perpendicular to the slope of the material as it runs into the measuring hopper from the supply bin. With this shape also it is very easy to provide for adequate protection for the rollers. By reference to Fig. 6 particularly, this will be readily understood. At the present time in devices of this character clogging of the gate mechanism presents a serious problem but with our improvements it is practically impossible to clog the bearing of the gate.

It should be noted that our arrangement for dumping the measuring hopper takes up very little head room so that a truck may be driven under without obstruction. When the door 19 is closed all of the parts associated with it are substantially on a level so that there is no part projecting any considerable distance below.

As before intimated we may use other types or forms of gates and in Figs. 8 to 10 inclusive we have illustrated a gate 41 which is substantially flat. This gate 41 is mounted upon rollers 42 which are fixed upon suitable bearing pins 43 to the vertically disposed plates 11. In these figures there is a horizontaly disposed apron 44 instead of the inclined apron 38 of the former figures. The surplus of displaced material discussed hereinbefore will, therefore, lie upon this horizontal apron 44 during the time that the measuring hopper is dumped but by means of a suitable strike off tool 45, this material may be pushed off into the measuring hopper to form part of the succeeding batch. It will therefore be seen that the displaced material is taken into account in this device just as much as it was taken into account in the former device, the only difference being, in fact, that the displaced material forms a part of the succeeding batch instead of the immediate batch. In this type the displaced material is just as accurate and uniform in its quantity as in the other type and it will, therefore, not introduce an unreliable or variable element into the measured batch.

In Fig. 11 we have shown an arrangement wherein the supply bin 7 is provided with a swinging gate 46. This gate could be made to open or close from either direction as indicated by the dotted line. It would have the same advantage incident to the other types of gates already discussed in that material would be displaced during its movement against the sloping apron 47 which would afterwards fall into the hopper and become a part of a measured batch.

In connection with the showing of Figs. 2 and 3 it should be pointed out that the natural slope line at 35 remains substantially unchanged during closing movement of the gate so that no unreliable element is introduced at this point.

We claim:

1. A device of the character described for handling bulk materials comprising, in combination, a discharge outlet whence discharged material forms one unbroken mass with that undischarged when said outlet is open; and a gate for said outlet permitting such unity of discharged and undischarged material when open and movable through the mass of material at a substantial interval from the outlet edge to close.

2. A device of the character described for handling bulk materials comprising, in combination, a discharge outlet for such material; a receptacle receiving the discharge therefrom; and a gate permitting free discharge of material to said receptacle, when open so as to form one mass from the receptacle back through the outlet, and movable across the outlet through the mass of material at a substantial interval from the outlet edge to close, and in such movement displacing additional material from the outlet past such edge, thus easing the movement.

3. A device of the character described for handling bulk materials comprising, in combination, a downward discharging outlet for such material; an open topped receptacle at an interval below said outlet extending laterally beyond an edge thereof; and a gate in the interval between outlet and receptacle movable laterally, to permit or intercept downflow of material, at an interval below the aforesaid edge permitting lateral feeding of material from the outlet during movement of the gate.

4. A device of the character described for batching bulk materials comprising, in combination, a downward discharging outlet for such material; a receptacle receiving the discharge therefrom; and a gate permitting free discharge of material to said receptacle, when open so as to form an unbroken column from the top of the receptacle back through the outlet, and movable across the outlet through the column of material at a substantial interval from the outlet edge to close, and in such movement displacing a definite additional amount of material from the outlet past such edge to the top of the receptacle, for inclusion in a batch; the movement of the gate being thus eased without impairment of the accuracy of batching.

5. A device of the character described for batching bulk materials comprising, in combination, a downward discharging outlet for such material; a substantially horizontal gate movable beneath said outlet at an interval below its edge, displacing material from the outlet laterally and downward past said edge and its own front edge in closing, and when closed extending beyond the outlet edge to the natural slope line of material therefrom, so as to prevent further outflow; and a measuring receptacle receiving around the front edge of the gate the material displaced as aforesaid, in addition to the previous discharge from the outlet while the gate was open, and delivering the whole when itself opened for discharge.

6. A device of the character described for handling bulk materials comprising, in combination, a discharge outlet for such material; an open topped receptacle at an interval below said outlet; a gate movable across said outlet in the interval between the same and said receptacle, and at an interval above the latter at both front and rear sides thereof; and an apron extending laterally outward from such sides.

7. A device of the character described for handling bulk materials comprising, in combination, a discharge outlet for such material; a receptacle receiving the discharge from said outlet and extending laterally beyond its edge; and a gate permitting free discharge of material to said receptacle, when open, so as to form one mass from the receptacle back through the outlet, and movable across the outlet through the mass of material at a substantial interval from the outlet edge to close; said gate when closed extending beyond said edge to the natural slope line of material therefrom, so as to intercept outflow without making contact with the receptacle.

8. A device for handling bulk materials comprising in combination, a supply receptacle, a measuring receptacle therebelow, a trough shaped gate between said receptacles movable through the material in the direction of the trough, and rollers for the gate at the upper outer edges of the trough protected from contact with the material by the sides of said trough.

In testimony whereof, we have hereunto signed our names.

ALBERT F. GARLINGHOUSE.
WILLIAM M. VENABLE.